(12) United States Patent
Gupta

(10) Patent No.: US 10,296,757 B2
(45) Date of Patent: May 21, 2019

(54) APPENDED KEY ID FOR KEY IDENTIFICATION DURING DATA ENCRYPTION

(71) Applicant: SAP SE, Walldorf (DE)

(72) Inventor: Vipul Gupta, Bangalore (IN)

(73) Assignee: SAP SE, Walldorf (DE)

( * ) Notice: Subject to any disclaimer, the term of this patent is extended or adjusted under 35 U.S.C. 154(b) by 293 days.

(21) Appl. No.: 15/223,954

(22) Filed: Jul. 29, 2016

(65) Prior Publication Data

US 2018/0034792 A1    Feb. 1, 2018

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01)

(58) Field of Classification Search
CPC .......................... G06F 21/6218; G06F 21/602
See application file for complete search history.

(56) References Cited

U.S. PATENT DOCUMENTS

| 2012/0017096 A1* | 1/2012 | Snider | G06F 11/1453 713/189 |
| 2013/0031229 A1* | 1/2013 | Shiga | G06F 17/3033 709/223 |
| 2013/0110828 A1* | 5/2013 | Meyerzon | G06F 17/30864 707/728 |
| 2013/0179684 A1* | 7/2013 | Furukawa | G06F 21/602 713/165 |
| 2013/0212704 A1* | 8/2013 | Shablygin | G06F 21/6218 726/28 |
| 2013/0246813 A1* | 9/2013 | Mori | G06F 17/30289 713/193 |
| 2014/0013112 A1* | 1/2014 | Cidon | G06F 21/6218 713/165 |
| 2014/0136840 A1* | 5/2014 | Spalka | G06F 21/6218 713/165 |
| 2014/0208104 A1* | 7/2014 | Yoon | H04L 9/3073 713/168 |
| 2015/0039901 A1* | 2/2015 | Freeman | G06F 21/602 713/189 |
| 2015/0095642 A1* | 4/2015 | Spalka | G06F 21/6218 713/161 |
| 2016/0224802 A1* | 8/2016 | Arnold | G06F 17/30312 |
| 2016/0232362 A1* | 8/2016 | Conway | G06F 21/602 |
| 2016/0241389 A1* | 8/2016 | Le Saint | H04L 9/0844 |
| 2016/0277374 A1* | 9/2016 | Reid | H04L 63/061 |
| 2016/0300073 A1* | 10/2016 | Pomeroy | G06F 21/6227 |
| 2017/0279736 A1* | 9/2017 | Pitio | G06Q 20/027 |
| 2017/0286713 A1* | 10/2017 | Pomeroy | G06F 21/6227 |

(Continued)

OTHER PUBLICATIONS

U.S. Appl. No. 15/067,164, filed Mar. 10, 2016.
U.S. Appl. No. 15/147,143, filed May 5, 2016.

*Primary Examiner* — Nelson Giddins
(74) *Attorney, Agent, or Firm* — Mintz Levin Cohn Ferris Glovsky and Popeo, P.C.

(57) ABSTRACT

When storing encrypted data within a database, a key identifier may be appended to the encrypted data as a prefix. Then, when decrypting the encrypted data, the key identifier may then be used to identify an encryption key used to encrypt the data, even when multiple encryption keys have been used in encrypting and storing the encrypted data as a whole.

20 Claims, 7 Drawing Sheets

(56) References Cited

U.S. PATENT DOCUMENTS

2017/0310479 A1* 10/2017 Sato .................. G06F 21/60
2017/0372093 A1* 12/2017 Pomeroy ............. G06F 21/6227
2018/0041336 A1* 2/2018 Keshava ............. H04L 9/0894
2018/0054303 A1* 2/2018 O'Toole ............. H04L 9/0822

* cited by examiner

| Key ID (16 bits) | UUID of the key | Algorithm used | Realm ID (Customer ID) |
|---|---|---|---|
| 0 | 7dc53df5-703e-9tb3-8670-fggsrltrertwe | AES/CTR/NoPadding | Realm 1 |
| 1 | 6sd5wef5-346h-wre4-8670-536mmn365 | AES/CTR/NoPadding | Realm 2 |
| 2 | 31dweef5-2356-sfg3-8670-b1c468f47f1f | AES/CBC/NoPadding | Realm 1 |

| 402 | 404 | 406 | 408 |
| --- | --- | --- | --- |
| Cluster Root ID | Realm ID (Customer ID) | Name | Other fields |
| 536mmn365 | Realm 1 | {0}UTejsdsdfsdfUye8 | .......... |
| 734sgsdd329 | Realm 1 | {2}56thsdhsdagrege | .......... |
| 23ffhgsdh432 | Realm 2 | {1}Llwe23125fsdhri5 | .......... |
| 6578dhst2122 | Realm 1 | {2}HwefdmaJkdowu | .......... |

APPENDED KEY ID FOR KEY IDENTIFICATION DURING DATA ENCRYPTION

TECHNICAL FIELD

This description relates to data encryption.

BACKGROUND

For data that is intended to be private and restricted, encryption of the data is a high priority. However, encryption typically utilizes appreciable time and resources. For example, bulk encryption efforts of large amounts of data may consume relatively large amounts of time and computing resources. Similarly, but on a smaller scale, encryption of even small amounts of data may be problematic, such as when access to the data is required in real time and even relatively small delays are unacceptable.

Often encryption is provided as a service, such as by an application provider to a customer. In these cases, the provider of the encryption service is charged with maintaining the safety and integrity of the data, while still providing a desired access level to the data. Moreover, in addition to the time and resource constraints referenced above, it is possible that a given encryption scheme may be compromised by hackers or other illicit users. Consequently, for these and other reasons, it is challenging to provide data encryption.

SUMMARY

In a multi-tenant architecture for providing cloud computing resources, it is possible to store data for different tenants together, e.g., within a single database, or even within a single row of a database. It is also possible to encrypt data of each tenant, using different encryption keys for each tenant, and using multiple encryption keys for a single tenant.

By generating a key identifier (ID) that is appended to encrypted data, e.g., as a prefix, it is possible to quickly and easily detect and extract the key ID during decryption operations. Then, the key ID may be used to identify the actual encryption key used for the encrypted data in question, so that decryption may proceed. In this way, for example, a tenant may quickly obtain desired data, while a provider of the multi-tenant architecture uses available computing resources in an efficient manner. For example, a tenant may obtain bulk tenant data, such as during a loading process of an application, or may obtain live search results in response to a search query submitted to an application.

The details of one or more implementations are set forth in the accompanying drawings and the description below. Other features will be apparent from the description and drawings, and from the claims.

BRIEF DESCRIPTION OF THE DRAWINGS

FIG. 2 is a table illustrating an example of a key identifier (ID) table of FIG. 1.

FIG. 4 is a table illustrating a database table, illustrating example states of objects with data encrypted using different encryption keys.

DETAILED DESCRIPTION

Figure 1:
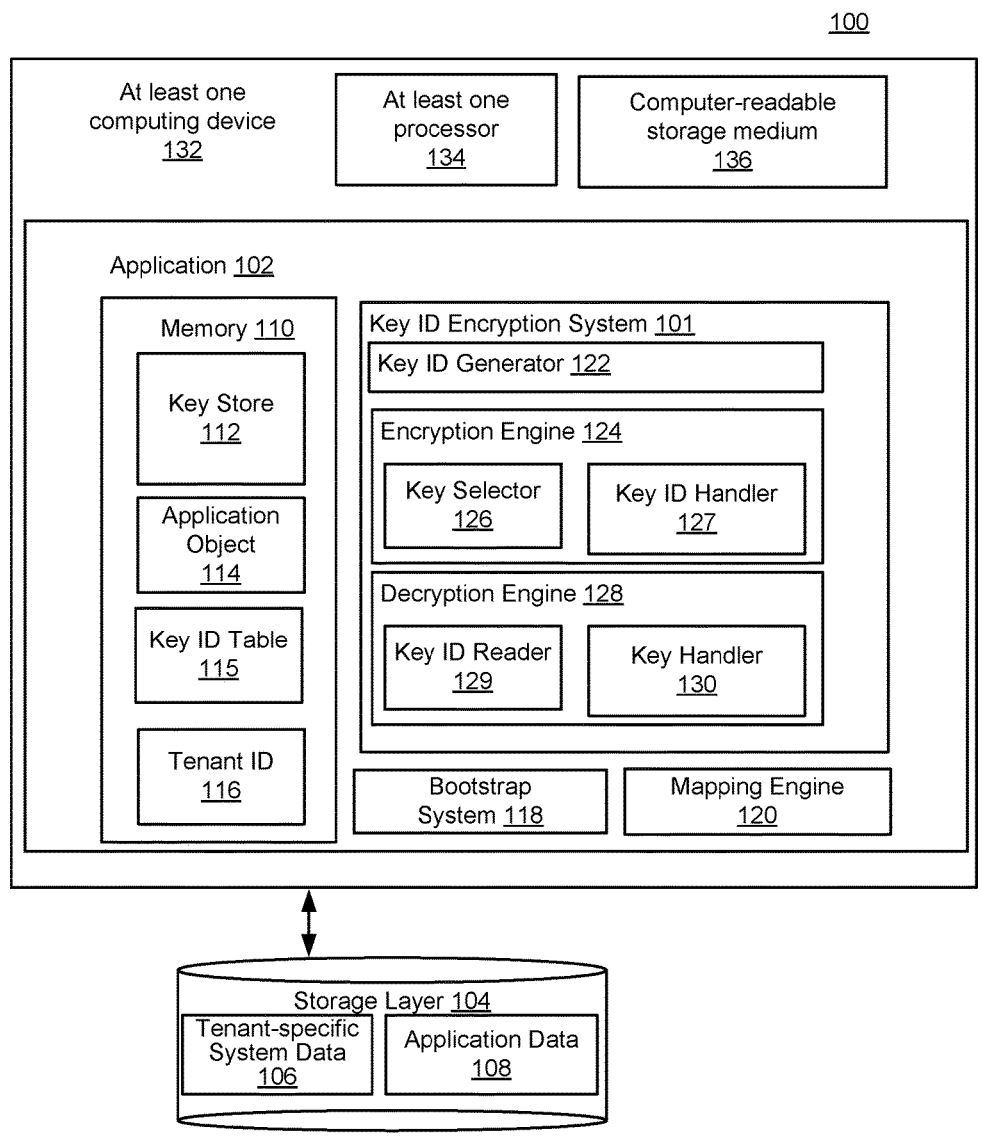
FIG. 1 is a block diagram of a system for encryption of application data using field-level metadata.

FIG. 1 is a block diagram of a system 100 for encryption of application data using multiple encryption keys. In the example of FIG. 1, a key identifier (ID) encryption system 101 is configured to provide data encryption in a fast, resource-efficient manner, even when many different encryption keys are used. The key ID encryption system 101 is further configured to adapt quickly, e.g., in response to a situation in which a security breach may have occurred, or to scenarios in which users perform modifications to system data or a manner in which system data is stored. For example, the key ID encryption system 101 may be configured to decrypt data previously-encrypted with one of a plurality of encryption keys. The key ID encryption system 101 also may be configured to encrypt data using a new or changed encryption key, with little or no downtime of the system 100 as a whole. Further, the key ID encryption system enables fast and efficient real-time searches of encrypted data, e.g., including modifying a search query, even when the encrypted data has been encrypted using multiple keys per tenant for a plurality of tenants.

In the example of FIG. 1, an object oriented software application 102 is illustrated and may be understood to represent one of many different types of object oriented software applications that exist today, or may be created in the future. Various specific examples of the object oriented software application 102 are provided below, or would be apparent to one of skill in the art. For example, applications may include enterprise resource management (ERM) systems, supply chain management (SCM) systems, or various other business applications related to management of customers' human resources or financial management.

In general, however, it will be appreciated for purposes of understanding operations of the system 100 of FIG. 1 that the object oriented software application 102 is constructed and executed in a manner that utilizes individual software objects to perform functionalities of the application 102. In this context, software objects, or objects, should be understood to refer to discrete, encapsulated software constructs that may correspond, for example, to individual, discrete entities, and which include, e.g., data that relates to that entity, as well as instructions or procedures for processing the included data. For example, with reference to the example applications just referenced, an object may refer to, or represent, a document (e.g., a sales order), a person, an inventory item, an account, or virtually any real-world, tangible or intangible entity that might be represented within, and processed by, the application 102.

Various potential advantages associated with such software objects in the context of the application 102, such as efficiencies in the development or maintenance of the application 102, or a speed or flexibility of the operations thereof, are generally well known, and are not described herein in detail, except as may be necessary or helpful in understanding operations of the system 100 of FIG. 1. Further in FIG. 1, and notwithstanding the various advantages just referenced with respect to use of object oriented programming techniques in the context of the application 102, it may be necessary or helpful to store data associated with use of the application 102 within a separate storage layer 104, which may include one or more database systems. For example, such separate data storage may be useful when the application 102 is not currently in use, or not in use by a particular user, or when a particular user of the application 102 requires only a subset of available data associated with the application 102 at a particular point in time.

Moreover, using the storage layer 104 for bulk storage of data may be more cost efficient, particularly when large quantities of data are required to be stored, accessed, maintained, shared between multiple systems, or otherwise utilized. In particular, such economies of scale, and other advantages, may be obtained in the context of implementing the application 102 and the storage layer 104 in a multi-tenant environment.

In other words, it is possible to provide use of the application 102, as well as storage of associated data, in the context of a service(s) provided to a plurality of customers/entities, referred to herein as tenants. For example, in scenarios in which the application 102 represents business software, then each such tenant may represent a particular business that pays fees associated with accessing and utilizing the system 100.

In the simplified example of FIG. 1, the storage layer 104 is illustrated as including tenant-specific system data 106, which generally represents all tenant-specific data associated with identifying, and otherwise managing, tenants having access to the system 100. For example, the tenant-specific system data 106 may identify individual tenants, as well as terms of use, quality of service agreements, authentication requirements, and any other data that may be useful in providing features and functions of the system 100 to individual tenants on a tenant-by-tenant basis. Of course, the storage layer 104 also may include various other types of system data associated with configuring, maintaining, and running the one or more database systems of the storage layer 104, although such system data is not necessarily described completely herein, for the sake of brevity and clarity.

The storage layer 104 is also illustrated as including application data 108. In this regard, it will be appreciated that the application data 108 refers generally to application-specific data that may be utilized to execute specific instances of the application 102 for individual tenants. In some implementations, a single tenant of the tenant-specific system data 106 may utilize two or more applications provided by a provider of the system 100, so that data is stored in the application data 108 in conjunction with its corresponding application for that tenant. In general, application data for multiple tenants and multiple applications may be stored together within the storage layer 104, including even within a single table of a single database.

In providing the application 102 and associated resources to the various tenants, the provider of the system 100 is typically required to maintain and ensure a desired type and extent of safety, integrity, security, and/or confidentiality of data belonging to each tenant that is stored within the application data 108. For example, as just referenced above, data that is private to a particular tenant may nonetheless be stored together within the storage layer 104 with private tenant-specific data of another tenant. Consequently, each tenant may be concerned that private data may be inadvertently or illicitly obtained by another tenant, by the provider of the system 100, or by any unauthorized party.

It is possible for the provider of the system 100 to provide a measure of data security through the use, e.g., of proper hardware and software provisioning and configuration, using various known techniques to maintain separation between, and limit access to, the various types of tenant-specific data. While these approaches may be sufficient in some cases, it may be necessary or desirable in other cases to provide encryption of private data, using one or more known encryption/decryption techniques.

In practice, however, existing encryption techniques may be expensive, time-consuming, and/or resource intensive, and, if not executed properly, may lead to various errors or malfunctions in operations of the system 100. For example, the computationally-intensive nature of many encryption techniques, combined with the potentially large quantity of data within the storage layer 104 and/or a potentially large number of tenants utilizing the system 100, may result in conventional encryption techniques being impractical or impossible to implement in an efficient or realistic manner, or in a manner that is acceptable to either the provider of the system 100 or the tenant requesting the encryption.

The system 100 provides for fast, efficient, secure encryption/decryption, and also enables the use of many different encryption keys and associated cryptographic algorithms. For example, public/private key pairs may be used, with each tenant requiring its own private (secret) key that must be maintained securely. Further, a single tenant may be provided with multiple keys.

For example, a tenant may request different keys for different (types of) data, e.g., for risk management purposes. The system 100 provides an ability to change keys in situations in which a security of a key has been compromised, or is suspected of being compromised, or just as part of a scheduled key rotation. Thus, in these and other scenarios, it may occur that encrypted data exists in a hybrid state within the system 100 in which multiple keys are live or active at the same time, i.e., some data of a tenant is encrypted using one key, while other data of the same tenant is encrypted using a different key.

In particular, the system 100 provides an ability to manage scenarios with bulk encryption of large quantities of data within the storage layer 104, including transitions between keys, with little or no downtime of the system 100. For example, it may occur that a tenant has a large quantity of data encrypted using a first set of keys within the storage layer 104, and an associated encryption algorithm(s) is compromised. The system 100 provides for a transition of the first set of keys to a second set of keys, without requiring a shutdown of the system 100 as a whole while the transition occurs.

To provide these and other features, as described in detail below, the key ID encryption system 101 utilizes a key identifier, such as a key prefix, that is included with encrypted data and that identifies a corresponding key (and, in some implementations, other encryption-relevant information). More particularly, the application 102 includes, and/or has access to, an application memory 110. As shown, the memory 110 may be utilized to store a key store 112 of secret keys for a plurality of objects represented by an application object 114. As also illustrated in FIG. 1, the memory 110 may be utilized to store a key identifier table 115.

As illustrated and described in detail below with respect to FIG. 2, encrypted data of the application object 114 may be provided with a key identifier, such as a key prefix, and the key ID table 115, as shown and described with respect to FIG. 3, utilizes the key ID to identify a corresponding encryption key used to encrypt/decrypt the object data, as needed. As also illustrated in FIG. 1, the memory 110 may be utilized to store a tenant identifier (ID) 116 that identifies the tenant associated with the application object 114, and any related data, as obtained from the tenant-specific system data 106.

The application 102 also includes, or is associated with, a bootstrap system 118 that is configured to perform various conventional boot operations associated with booting or loading the application 102. In example implementations, application instances of the application 102 may be shared among multiple tenants, and the bootstrap system 118 also may be configured to execute any tenant-specific bootstrap operations for a particular tenant mapped to a particular application instance.

Additionally, the bootstrap system 118 may be configured to facilitate the types of encryption operations referenced above. In particular, at a time of booting, the bootstrap engine 118 may operate in conjunction with a mapping engine 120 to facilitate a loading of the object 114 from the storage layer 104 into the memory 110.

For example, in specific implementations, as described in more detail below, the mapping engine 120 may represent an object to relational mapping (ORM) engine. Such mapping may be utilized when the storage layer 104 includes a relational database, and therefore not directly compatible with the object-oriented data structures of the application 102. In other words, it may be more convenient, efficient, or cost-effective to store data of the storage layer 104 in a relational manner, even though it may be more practical, faster, or otherwise preferable to utilize object-oriented techniques with respect to execution of the application 102.

The key ID encryption system further includes a key identifier (ID) generator 122 that is configured to generate a unique (within the system 100) key identifier, such as a key prefix, to be stored within the key identifier table 115 for identifying a corresponding encryption key, and also to be attached to encrypted data by virtue of operations of an encryption engine 124. That is, once the key store 112 and the key identifier table 115 are configured, then at a time of encryption of data, a key selector 126 may be configured to select from among a plurality of live encryption keys to perform the desired encryption, while a key identifier handler 127 is configured to append, attach, or otherwise associate a corresponding key identifier to the encrypted data.

Once encrypted, the encrypted data may then be passed to the storage layer 104 and stored therein in a secure manner. When later required to be loaded to the application 102, a decryption engine 128 may be configured to utilize the included key identifier, as determined by a key identifier reader 129 in conjunction with the key identification table 115, to identify a corresponding key from the key store 112. Whereupon, a key handler 130 may retrieve the corresponding key, and the decryption engine 128 may then proceed to perform decryption operations using the retrieved key.

Since, as described, encryption/decryption is executed within the application 102 itself, data may be encrypted, if desired, when stored within the storage layer 104, as well as during transfer between the storage layer 104 and the application 102 (e.g., when "in motion" between the storage layer 104 and the application 102), and may be decrypted only when, and to the extent, required for the processing in question.

For example, as already described above, it may be desirable to decrypt data when loading a live instance of the object 114 into the memory 110. In other examples, the application 102 may generate reports with respect to tenant-specific application data, or execute a search of tenant-specific application data of the application 102. Other types of data processing, such as various data updates or specific interactions with other applications, may be associated with, or require, decrypted data. In all such examples, it will be appreciated that the techniques of the system 100 of FIG. 1 provide for the types of flexible, efficient, fast, and reliable encryption/decryption techniques described herein.

For example, in the context of searching tenant-specific encrypted data, the system 100 contemplates that the storage layer 104 will include encrypted application data for multiple tenants, where each tenant may be provided with two or more encryption keys. As a result, as described herein, the storage layer 104 may include encrypted data for multiple tenants and using multiple encryption keys within a single database, or even within a single row of a database. Performing a search or executing almost any type of real-time or live interactions with such encrypted data (e.g., running a report) is difficult or impossible, since, for example, the search term of a query will not be present within the data, as encrypted. In the system 100 of FIG. 1, the application 102 may be enabled to modify a search query or other interaction with the storage layer. For example, the application may modify the search query before the search query is even sent to the storage layer 104, using the techniques described herein, to facilitate completion of the search in a fast, resource-efficient manner. For example, a search engine of the application 102 may modify a search query to restrict results from the storage layer 104 to only one or more key IDs of a tenant executing the search (e.g., just to key IDs from customer realm 1, in the example of FIG. 2, below). In this way, only a smaller subset of the encrypted data is retrieved and decrypted.

In the example of FIG. 1, the application 102 is illustrated as being executed using at least one computer 132, which itself includes at least one processor 134 and a non-transitory computer readable storage medium 136. In other words, for example, the at least one computing device 132 may represent two or more computing devices in communication with one another, such as in a client/server architecture implemented over a computer network.

Somewhat similarly, the at least one processor 134 may represent two or more hardware processors operating in parallel. The non-transitory computer readable storage medium 136 may generally represent any suitable storage medium designed to store instructions which, when executed by the at least one processor 134, provides an executable version of the application 102.

Accordingly, it will be appreciated that the application 102 is illustrated as including the plurality of components/sub-components 110-130, but that, in various implementations, it may occur that one or more of these components/sub-components is implemented using two or more further sub-components. Similarly, but conversely, it will be appreciated that any two or more of the components/sub-components may be combined for execution as a single component. Even more generally, it will be appreciated that the system 100 of FIG. 1 is intended merely as a non-limiting example of various embodiments that may be provided using the various techniques, features, and functions described herein, and that additional or alternative variations may be implemented by one of skill in the art.

FIG. 2 is a table 200 illustrating an example of the key ID table 115 of FIG. 1. In the example of FIG. 2, a column 202 includes a key ID that is a short, unique (within the system) identifier of a corresponding key. More specifically, a column 204 includes a universally unique identifier (UUID) of each key corresponding to each key ID of the column 202.

In other words, each UUID of the column 204 may be used to perform a lookup operation of a corresponding encryption key from the key store 112.

A column 206 includes one or more encryption algorithms, and related information (such as how the encryption algorithm is applied), for each corresponding key of the same row of the key ID table of FIG. 2. In the example of FIG. 2, illustrative, non-limiting examples of encryption algorithms and are provided, such as the Advanced Encryption Standard (AES), and any associated mode of encryption, such as the counter mode (CTR) or the cipher block chaining (CBC) mode. Other encryption details (such as whether padding is used, e.g., to make it more difficult for a potential hacker to determine a beginning or ending of a string) also may be included. Of course, in other implementations, other encryption algorithms and related techniques may be used, or, if a single encryption algorithm is used, the column 206 may be omitted.

Finally in the example of FIG. 2, a column 208 includes a realm ID, referencing a customer realm within the system 100 of FIG. 1. In other words, the realm ID may also be considered or implemented as a customer ID, generally representing, or corresponding to, the tenant ID 116 of FIG. 1.

Figure 3:
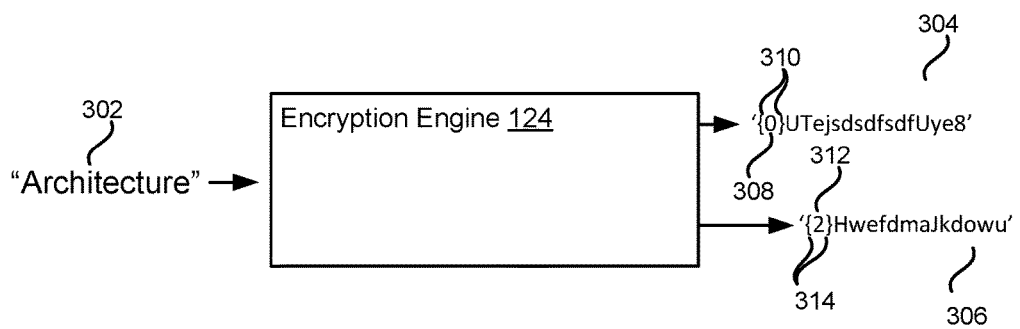
FIG. 3 is a block diagram illustrating an example encryption of the string or term 'architecture.'

FIG. 3 is a block diagram illustrating an example encryption of the string or term 'architecture' (302). As shown, after passing through the encryption engine 124, the term 'architecture' may be encrypted as a first encryption 'UTejsdsdfsdfUye8' 304 for a customer of realm 1 of the example of the table 200 of FIG. 2. The same term 'architecture' also may be encrypted as encrypted data string 'HwefdmaJkdowu' 306 for the customer of realm 1. For example, if the key of key ID "0" is being used at a first time of encrypting 'architecture,' then an encrypted string 304 may be obtained. At a later time, due to key rotation or other reason described herein, an encryption key of the key ID "2" may be used, yielding the encrypted string 306. Of course, a different customer using a different key (e.g., the key corresponding to the key ID "1") would get a third, different encryption of the term 'architecture.'

As shown in the example of FIG. 3, the encrypted data string 304 may include a key prefix 308 dependent thereto. As also illustrated, the key prefix 308 may be demarcated using key boundaries 310. As shown in the example of FIG. 3, the key boundaries 310 are brackets { }. Of course, the key boundaries 310 of FIG. 3 are intended merely as illustrative, non-limiting examples. In other implementations, any symbol that will not be included within the encrypted string 304 itself may be used.

In other words, it will be appreciated from the above description that in the example of FIG. 3, the key prefix 308 corresponds to the key ID "0" of the column 202 of FIG. 2, and indicates the encryption key corresponding to the UUID of the column 204, while also identifying the appropriate encryption algorithm in the customer realm. However, it also may occur that the numeral 0 happens to appear within the encrypted string 304 itself, e.g., as a random result of the encryption process. Thus, it will be appreciated that the key ID or key prefix boundaries 310 eliminate the possibility that the numeral 0 appearing in the encrypted string 304 (or other encrypted string) will be wrongly interpreted as a key prefix, which would then erroneously be interpreted as indicating a need for decryption of subsequent characters of the string. In other words, the key boundaries may be selected as characters that are excluded from available characters that might potentially be included within the encrypted data string 304.

Also in FIG. 3, the encrypted string 306 is illustrated as including a key ID 312 as the numeral "2," which therefore corresponds to the third row of the column 202 of FIG. 2. As such, the key ID 312, as similarly identified using the key boundaries 314, enables the lookup of a corresponding encryption key, using the column 204 of FIG. 2, as well as any corresponding encryption algorithm identified in column 206 for the customer of realm 1 in the column 208.

FIG. 4 is a table 400 illustrating a database table of the data storage layer 104, illustrating example states of objects with data encrypted using different encryption keys. In other words, FIG. 4 illustrates an example of a hybrid state of the table 400 within the database of the storage layer 104.

In the example of FIG. 4, a column 402 includes a cluster root ID of a corresponding customer realm identified by realm ID within a corresponding row of a column 404. Thus, FIG. 4 illustrates an example of scenarios in which, as referenced above, each customer or tenant may own data associated with one or more nodes, where sets of nodes may be included within corresponding clusters, and the clusters are organized and identified as being related to one another through the use of a cluster root ID. Of course, these and related techniques are merely by way of example, and it will be appreciated the data of the storage layer 104 may be organized in many different ways. Further in FIG. 4, a column 406 includes encrypted strings within the various rows thereof. As shown, each encrypted string is prefixed with a key prefix within prefix boundaries.

Figure 5:
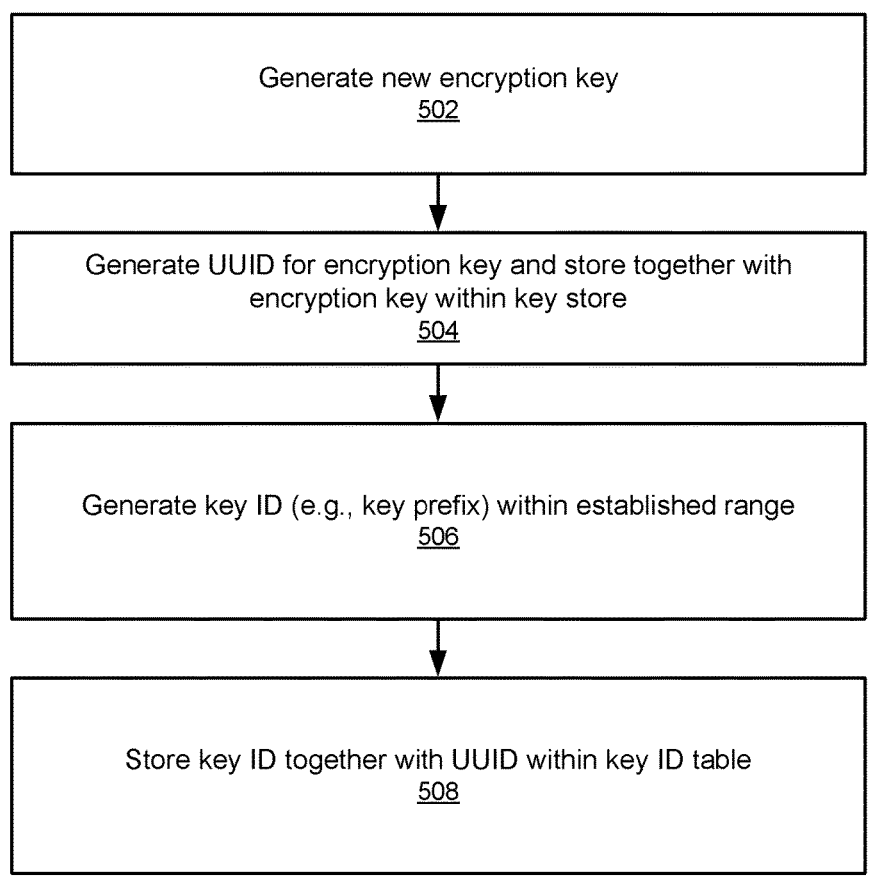
FIG. 5 is a flowchart illustrating an example implementation for generating a new encryption key and associated key ID, using the system of FIG. 1.
Figure 6:
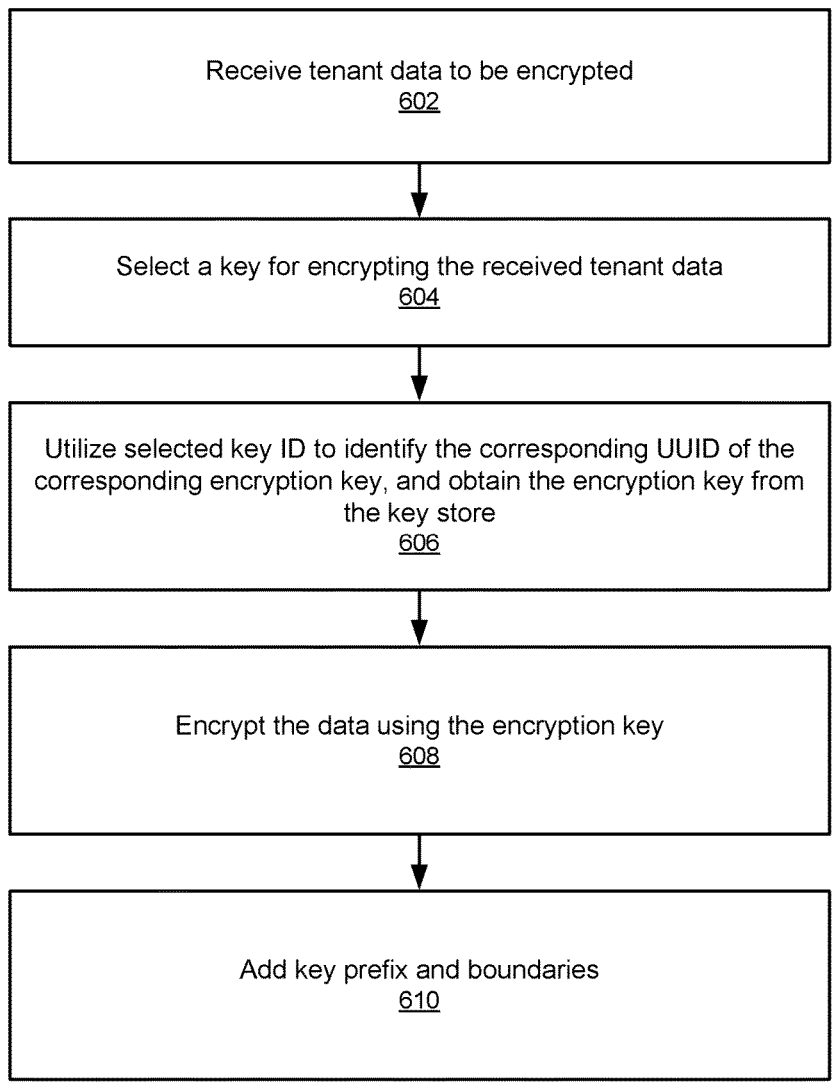
FIG. 6 is a flowchart illustrating an example implementation for performing encryption, using the system of FIG. 1.
Figure 7:
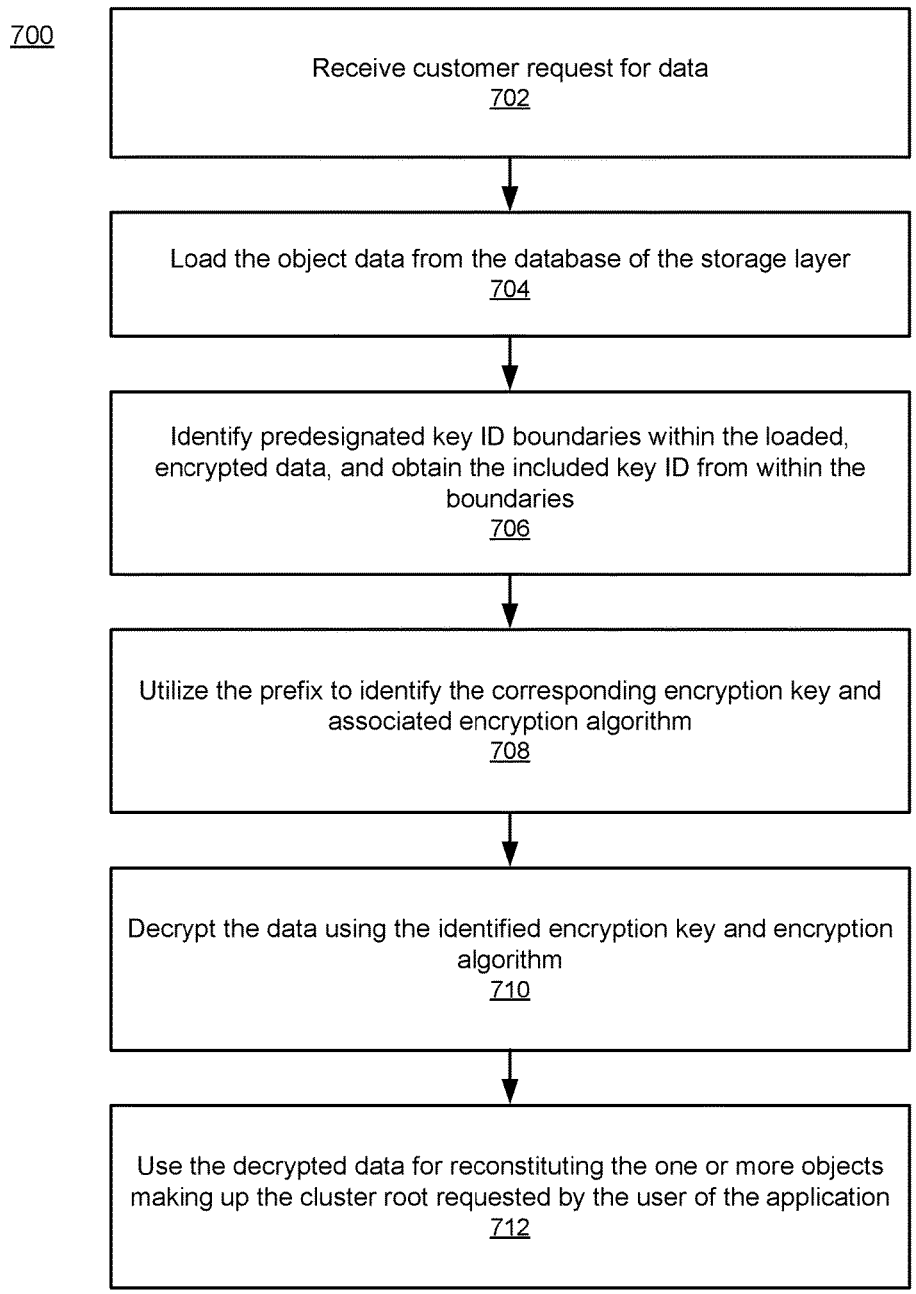
FIG. 7 is a flowchart illustrating example techniques for performing decryption, using the system of FIG. 1.

Thus, FIGS. 1-4 illustrate and describe an example architecture and associated example details for data storage. FIGS. 5, 6, and 7 are flowcharts illustrating more detailed example techniques for utilizing the architecture of the system 100 together with the data storage approaches of FIGS. 2, 3, and 4.

Specifically, FIG. 5 is a flowchart 500 illustrating an example implementation for generating a new encryption key and associated key ID. FIG. 6 is a flowchart 600 illustrating an example implementation for performing encryption. FIG. 7 is a flowchart 700 illustrating example techniques for performing decryption.

In FIGS. 5-7, the various operations are illustrated as separate, sequential operations. In additional implementations, additional or alternative operations or sub-operations may be included, and/or one or more operations or sub-operations may be omitted. In all such implementations, any two or more of the operations or sub-operations may be executed in a partially or completely overlapping or parallel manner, or in a nested, iterative, looped, or branched fashion.

In the example of FIG. 5, it is assumed that a particular tenant has opted in to the key ID encryption system 101 of FIG. 1, and requires a new encryption key. For example, as referenced above, a new encryption key may be required if an existing key or encryption algorithm has been compromised, or if the tenant wishes to rotate or update an existing encryption key, or to add another key to the tenant's existing set of encryption keys. For example, the encryption engine 124 may generate an encryption key using conventional techniques for storage within the key store 112, and may also generate a corresponding UUID for performing a lookup of the generated key (504).

A corresponding key ID for the encryption key and associated key UUID may then be generated (506), e.g., by the key ID generator 122. In example implementations, the key ID generator 122 may be configured to generate the key ID within a predesignated range.

For example, an upper bound of a number of keys that might be needed within the system 100 may be established, such as, for example, 60,000 keys. This number of keys may be represented by an unsigned integer of $2^{16}-1$ (i.e., from 0 to 65,535 in a two byte unsigned integer). In this way, as may be appreciated from the above example of FIG. 2, the key ID of the column 202 may be represented as a 16 bit identifier, which is easier to store than the generally long string (e.g., 16 bytes) of the UUID of the column 204. Moreover, as may be appreciated from the architecture of FIG. 1, additional security is provided by virtue of the additional separation of the key ID from the actual encryption key corresponding thereto.

Finally in FIG. 5, the key ID may then be stored along with the key UUID within the key ID table 115, and along with any associated algorithm or tenant information (508), as illustrated in each row of the table 200 of FIG. 2.

In the example of FIG. 6, in which encryption is performed on currently unencrypted data, tenant data to be encrypted is received (602), e.g., at the encryption engine 124. For example, a user of the application 102 may enter new data, or the application 102 may obtain new data through interactions with other applications (not shown).

A key for encrypting the currently-unencrypted data may then be selected (604). For example, the key selector 126 of FIG. 1 may select a live key from among the plurality of keys associated with the tenant who owns the data being encrypted. For example, in some implementations, with reference to table 2, it may occur that a customer with the same realm ID (e.g., realm 1) will have multiple keys, such as the key of row 1 with the table 200 of FIG. 2 associated with a key ID of 0, as well as a key associated with the third row of the table 200 of FIG. 2, associated with a key ID of 2.

In various implementations, one of the two keys may be designated as the live key to be used for encryption newly-received data. For example, a key corresponding to a current highest key ID may be designated as a live key. Depending on a manner in which the key ID is generated, other techniques may be used, such as selecting the lowest available key ID. In still other implementations, the key ID may be selected randomly from among currently-used IDs, or using some other technique.

Once the current, live key ID has been selected, the selected key ID may be utilized to identify the corresponding UUID of the corresponding encryption key, so that the encryption key may be obtained from the key store 112 (606), e.g., by the key handler 127 of FIG. 1. The obtained key may thereafter be utilized to encrypt the data (608) as illustrated above with respect to the example of FIG. 3.

As also shown and described with respect to FIG. 3, a prefix corresponding to the selected, live key ID may then be added to the encrypted data within previously-selected key ID boundaries (610). For example, the key ID handler 127 may be configured to add the bounded prefix to the encrypted data, where the format of the boundaries is selectable from among candidates that are determined not to be otherwise present within the encrypted strings. For example, the key ID may be stored in a special block of 2 or 3 bytes that includes the selected boundaries.

It may be noted that the encryption approach of FIGS. 1-6 also enables determinations of faults in data returned from the database, by mapping the key id in the data returned to the realm ID in the key table 115 (e.g., table 200 of FIG. 2). Consequently, for example, if a bug in the system causes, for a session of Realm 1, return of data having key ID "1," then the key ID table 115/200 will demonstrate that in fact key ID 1 belongs to Realm 2. As a result, the application 102 may indicate an exception and fault the relevant data request.

During the decryption operations of FIG. 7, a customer request for data is received (702). For example, encrypted customer or tenant data may be stored within the storage layer 104 using the table 400 of FIG. 4, as described above. In some implementations, each node on a cluster of the multi-tenant architecture of FIG. 1 serving a defined set of customers creates a cache during bootstrap or other startup operations, and loads entries for realms being served into the cache.

When a particular object is requested, the object data is loaded from the database of the storage layer 104 (704), such as by the bootstrap system 118 and/or the mapping engine 120. Then, the key ID reader 129 of FIG. 1 may proceed to identify predesignated key ID boundaries within the loaded, encrypted data, and obtain the included key ID from within the boundaries (706).

Accordingly, the prefix may be utilized to identify the corresponding encryption key and associated encryption algorithm (708). For example, the key handler 130 may access the key table 115/202 to identify the encryption key and algorithm, which may then be retrieved from the key store 112. Thereafter, the data may be decrypted (710) by the decryption engine 128, and the decrypted data may then be used for reconstituting the one or more objects making up the cluster root requested by the user of the application 102 (712).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions, which when executed by at least one programmable processor, cause operations comprising:
    generating a first key identifier corresponding to a first encryption key stored in a key store, the first encryption key associated with a first tenant of a database;
    encrypting, based at least on the first encryption key, object data associated with the first tenant, the object data being encrypted to generate a first encrypted data string;
    appending, to the first encrypted data string, the first key identifier;
    transferring, for storage at the database, the first encrypted data string appended with the first key identifier, the database storing a plurality of encrypted data strings, the plurality of data strings including the first encrypted data string appended with the first key identifier associated with the first tenant, and the plurality of data strings further including a second encrypted data string appended with a second key identifier associated with a second tenant of the database;
    receiving, from a user associated with the first tenant, a request to retrieve data from the database; and
    responding to the request from the user associated with the first tenant by at least sending, to the database, a query configured to retrieve, from the database, a subset of the plurality of encrypted data strings stored in the database, the subset of encrypted data strings including the first encrypted data string appended with the first key identifier but excluding the second encrypted data string appended with the second key identifier.

2. The computer program product of claim 1, further comprising:
    storing the first key identifier and the second key identifier within a key identifier table accessible to an object-oriented application;
    selecting, based at least on the first key identifier being associated with the first tenant, the first encryption key for encrypting the object data associated with the first tenant instead of the second encryption key.

3. The computer program product of claim 2, wherein the database and the object-oriented application are implemented within a multi-tenant architecture that includes the first tenant and the second tenant, and wherein an instance of the object-oriented application to is provided to each of the first tenant and the second tenant.

4. The computer program product of claim 2, wherein the first key identifier is generated based on a universally unique key identifier of the first encryption key, and wherein the first key identifier is stored together with the universally unique key identifier of the first encryption key in the key identifier table.

5. The computer program product of claim 2, wherein the first tenant is further associated with a third encryption key having a third key identifier, and wherein the subset of encrypted data strings retrieved from the database further includes encrypted data strings appended with the third key identifier.

6. The computer program product of claim 5, wherein the first encryption key and the first key identifier are generated after the third encryption key and the third key identifier, and wherein the first encryption key is selected for encrypting the object data instead of the third encryption key based at least on the first key identifier being more recently generated than the third key identifier.

7. The computer program product of claim 1, wherein the first key identifier and/or the second key identifier are generated within a range corresponding to a maximum quantity of encryption keys to be used.

8. The computer program product of claim 1, wherein the first key identifier is appended as a first prefix to the first encrypted data string, and wherein the second key identifier is appended as a second prefix to the second encrypted data string.

9. The computer program product of claim 1, wherein the first key identifier is appended to the first encrypted data string by at least enclosing the first key identifier within key boundaries, and wherein the key boundaries comprise characters that are not part of the first encrypted data string.

10. The computer program product of claim 1, further comprising:
    identifying, based at least on the first key identifier appended to the first encrypted data string retrieved from the database, the first encryption key used to encrypt each encrypted data string in the subset of encrypted data strings; and
    decrypting, based at least on the first encryption key, the first encrypted data string.

11. The computer program product of claim 10, wherein the request is to retrieve, from the database, data including a search term, and wherein the response to the request further includes identifying, subsequent to decrypting the subset of encrypted data strings, one or more decrypted data strings that include the search term.

12. The computer program product of claim 1, wherein the key store further storing a second encryption key having the second key identifier, and wherein the second encryption key is associated with the second tenant.

13. A method, comprising:
generating a first key identifier corresponding to a first encryption key stored in a key store, the first encryption key associated with a first tenant of a database;
encrypting, based at least on the first encryption key, object data associated with the first tenant, the object data being encrypted to generate a first encrypted data string;
appending, to the first encrypted data string, the first key identifier;
transferring, for storage at the database, the first encrypted data string appended with the first key identifier, the database storing a plurality of encrypted data strings, the plurality of data strings including the first encrypted data string appended with the first key identifier associated with the first tenant, and the plurality of data strings further including a second encrypted data string appended with a second key identifier associated with a second tenant of the database;
receiving, from a user associated with the first tenant, a request to retrieve from the database;
responding to the request from the user associated with the first tenant by at least sending, to the database, a query configured to retrieve, from the database, a subset of the plurality of encrypted data strings stored in the database, the subset of encrypted data strings including the first encrypted data string appended with the first key identifier but excluding the encrypted data string appended with the second key identifier.

14. The method of claim 13, further comprising:
storing the first key identifier and the second key identifier within a key identifier table accessible to an object-oriented application;
selecting, based at least on the first key identifier being associated with the first tenant, the first encryption key for encrypting the object data associated with the first tenant instead of the second encryption key.

15. The method of claim 13, wherein the first tenant is further associated with a third encryption key having a third key identifier, and wherein the subset of encrypted data strings retrieved from the database further includes encrypted data strings appended with the third key identifier.

16. The method of claim 13, wherein the database and the object-oriented application are implemented within a multi-tenant architecture that includes the first tenant and the second tenant, and wherein an instance of the object-oriented application to is provided to each of the first tenant and the second tenant.

17. The method of claim 13, wherein the first key identifier is appended as a first prefix to the first encrypted data string, and wherein the second key identifier is appended as a second prefix to the second encrypted data string.

18. The method of claim 13, wherein the first key identifier is appended to the first encrypted data string by at least enclosing the first key identifier within key boundaries, and wherein the key boundaries comprise characters that are not part of the first encrypted data string.

19. A system, comprising:
at least one programmable processor; and
at least one memory storing instructions, which when executed by the at least one programmable processor, result in operations comprising:
generating a first key identifier corresponding to a first encryption key stored in a key store, the first encryption key associated with first tenant of a database;
encrypting, based at least on the first encryption key, object data associated with the first tenant, the object data being encrypted to generate a first encrypted data string;
appending, to the first encrypted data string, the first key identifier;
transferring, for storage at the database, the first encrypted data string appended with the first key identifier, the database storing a plurality of encrypted data strings, the plurality of data strings including the first encrypted data string appended with the first key identifier associated with the first tenant, and the plurality of data strings further including a second encrypted data string appended with a second key identifier associated with a second tenant of the database;
receiving, from a user associated with the first tenant, a request to retrieve data from the database;
responding to the request from the user associated with the first tenant by at least sending, to the database, a query configured to retrieve, from the database, a subset of the plurality of more encrypted data strings stored in the database, the subset of the plurality of encrypted data strings including the first encrypted data string appended with the first key identifier but excluding the second encrypted data string appended with the second key identifier.

20. The system of claim 19, wherein the first tenant is further associated with a third encryption key having a third key identifier, and wherein the subset of encrypted data strings retrieved from the database further includes encrypted data strings appended with the third key identifier.

* * * * *